May 18, 1943. R. E. YOUNG 2,319,652
DAMPER FOR FURNACES AND THE LIKE
Filed May 21, 1942 6 Sheets-Sheet 1

Inventor:
Raymond E. Young,
by
Atty.

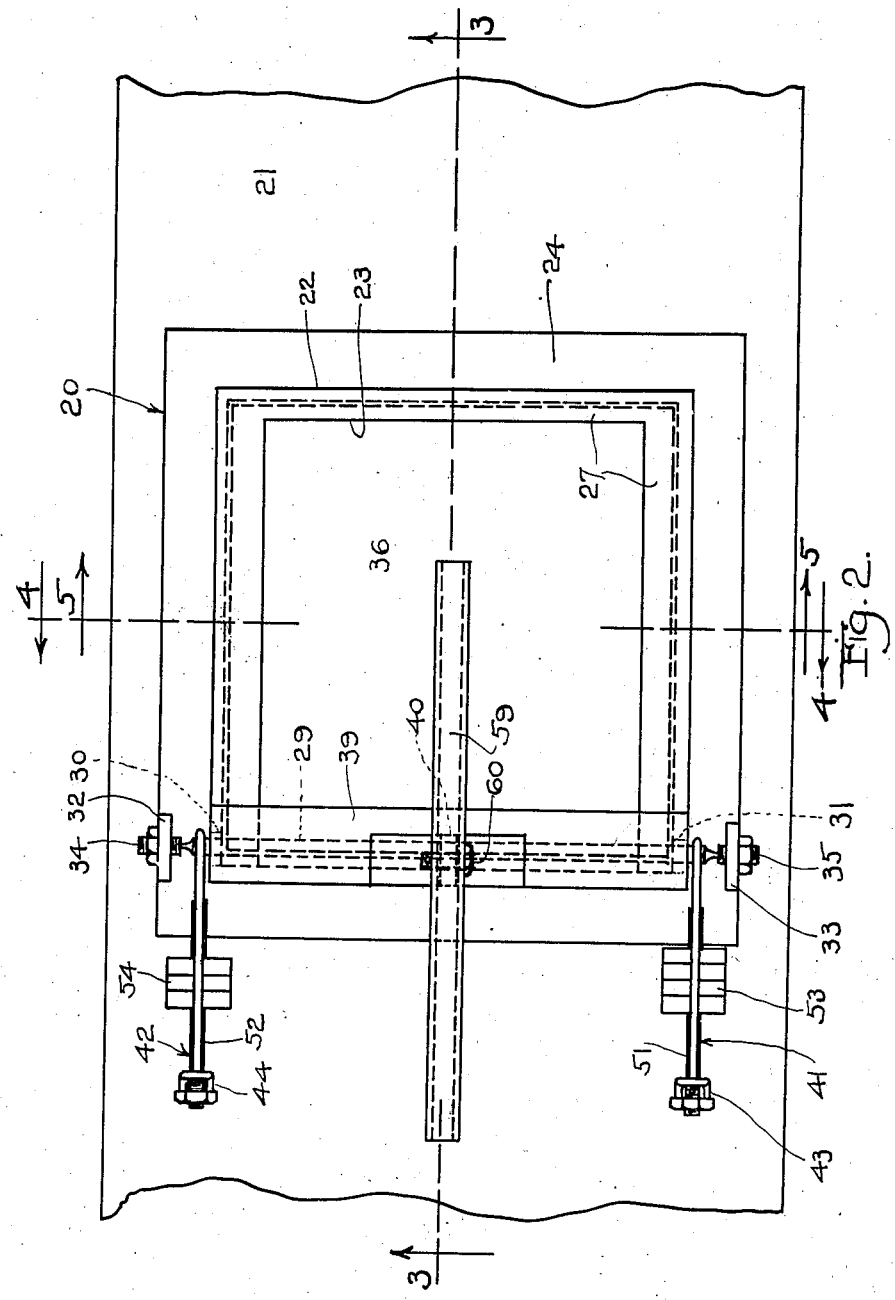

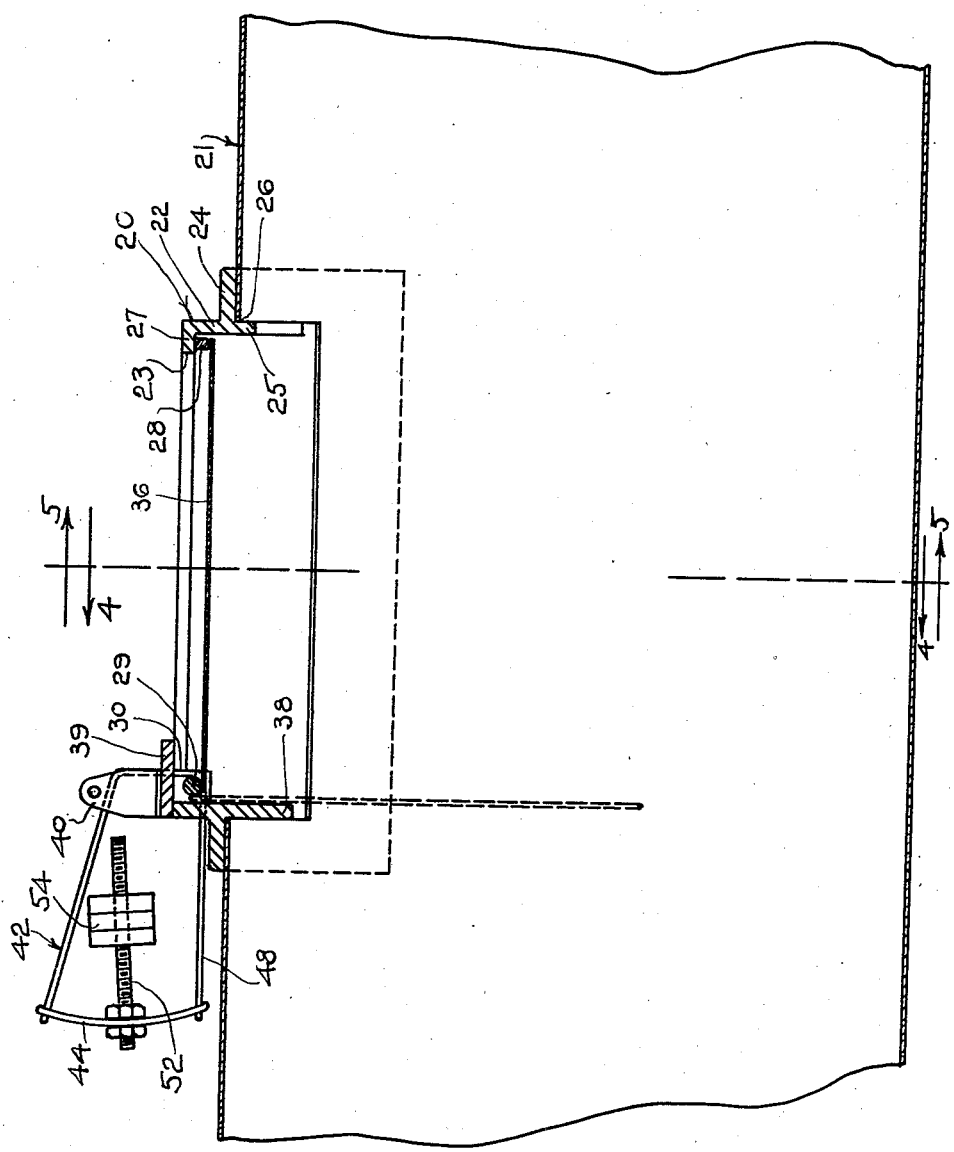

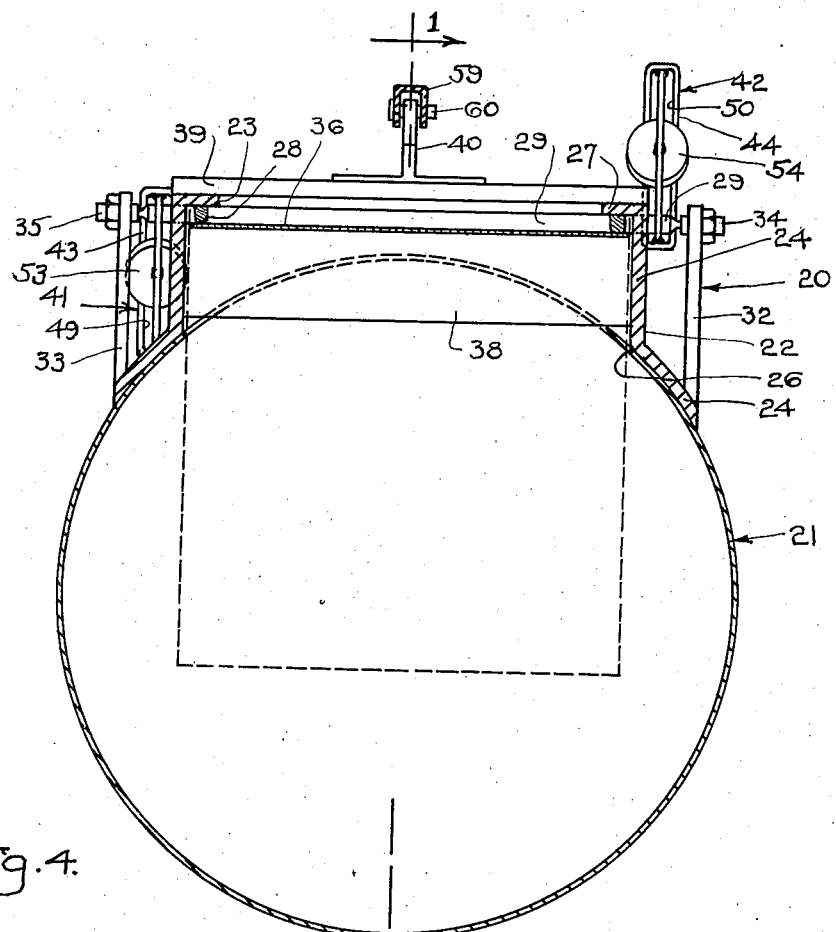
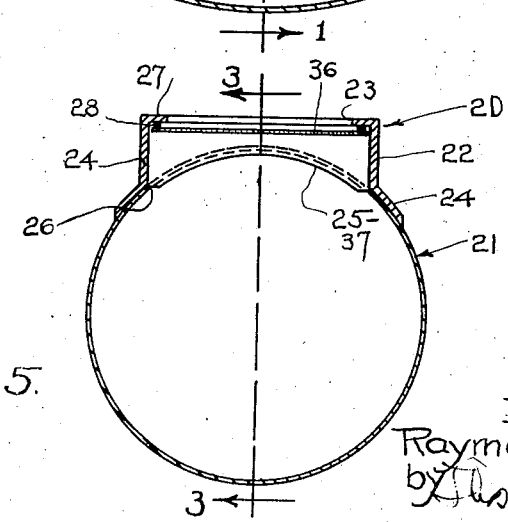

Patented May 18, 1943

2,319,652

UNITED STATES PATENT OFFICE 2,319,652

DAMPER FOR FURNACES AND THE LIKE

Raymond E. Young, Harvey, Ill.

Application May 21, 1942, Serial No. 443,855

9 Claims. (Cl. 236—45)

This invention relates to improvements in dampers for furnaces, and the like, and to the operation and control thereof. The dampers herein disclosed may be generally termed barometric dampers, that is, those in which the damper operation is determined by, or is dependent on the amount of draft and/or air flow through the flue to which these dampers are connected; but it will become evident hereinafter that certain of the features herein disclosed are not limited to dampers of this general category, except as I may limit said features in the claims to follow.

One important feature of the present invention relates to the provision of a damper of such construction that it is very sensitive in its operation, and will respond quickly and accurately to very slight changes in the amount of draft within the flue. In this connection it is an object of the invention to so arrange the damper and to so balance or counter-balance it that its opening and closing movements will be effected by very slight changes of draft or differential of pressure. In this connection it is a further object to so arrange the damper that such counter-balance may be readily and simply adjusted, either in the original installation of the damper, or thereafter, to ensure damper operation to maintain the desired differential of pressure within slight variations or limits or operational changes, and for the pre-selected differential of pressure, within the capacity of the design. This will make it possible to use these dampers for many classes of service, such as in connection with stokers, or oil burners, or hand firing, or other types and kinds of furnace operation.

In connection with the foregoing I may here mention that in some classes of furnaces, such as oil burners, a very small draft is used (in oil burners as small as 0.01" water), by way of illustration. Variations of chimney pull, especially sudden variations due to rapid wind changes, tend to cause "flutter" in the operations of barometric dampers, so that these wind changes tend to interfere with maintenance of steady damper operations, and tend to prevent maintenance of constant pressures within the furnace. Such interference is especially troublesome in the case of operations at low differentials, such as in the case of oil burners, above referred to; but I have found that dampers incorporating the features of my present invention will continuously maintain very low differentials of draft or pressure, even with very rapid and violent changes of wind condition, such as "squally" weather.

A further feature of the invention relates to the provision of a damper arrangement such that the air admitted to the flue by the damper flows substantially parallel to the direction of gas flow in said flue, so that such damper admitted air will immediately assume the flue flow conditions, and thus ensure draft control with the maximum of certainty and accuracy, and with the least possible interference with the flue flow conditions. Also in this connection to avoid turbulence as much as possible at the location of introduction of the damper admitted air, and to ensure smooth stream flow conditions at all times, and with all normal operating damper positions.

In connection with the foregoing I have so arranged the damper that when fully closed it seals against a suitable stop, and parallel to the direction of stream flow; whereas as the damper blade opens it swings down slightly into the flue, but with little interference with the stream flow conditions existing within said flue; and this is true even for exposure of relatively large damper openings. This result is secured by the form of my improved damper, as well as by the manner and position of its pivotal mounting with respect to the flue proper.

In connection with the foregoing I have provided means and a mounting for the damper such that when in fully closed position the damper blade lies parallel to the axis of the flue, and slightly outside the body of said flue; and such that as the blade moves to open position it swings down into the body of the flue, but with a minimum amount of interference with gas flow along the flue towards the stack (for ordinary or normal amounts of damper opening). Furthermore, this result is further accomplished by the use of a rectangular form of damper blade which is flat, the mounting and closed position stop being correspondingly properly formed.

Still, in connection with the foregoing I have so arranged the parts that in special cases it is possible to force the damper blade down into the flue to a position substantially at right angles to the flue axis so that maximum interference with gas flow through the flue will be produced, thereby causing the damper blade to act substantially as a stop to greatly interfere with gas movement along the flue. Thus the damper blade will act effectively as a baffle or check. In this connection I may provide a connection to the chain or control line so that the blade will be drawn and retained in this exceptional position when the fire is to be checked; but still when such chain or control line is thereafter released the blade will be permitted to again swing to its normal operating position, and to perform its normal barometric damper functions.

A further feature of the invention relates to the provision of a very perfect pivotal mounting for the blade, and one which is substantially frictionless. Also, to so arrange this pivotal mounting that such frictionless condition will be maintained for an indefinite life, and substantially without corrosion or deleterious effect due to the flue gases or the like. To this end it is an object of the invention to so arrange the parts that this bearing is outside of the flue, and completely removed from the effect of the flue gases, and also to bring this bearing to a location where it may be readily inspected or adjusted from time to time if need be. It is noted however, that the blade which moves into the flue proper is connected to this bearing structure, so that there must be a suitable opening from the location of the bearing to the interior of the flue. It is a further object of the invention to provide this opening of such form and positioning and arrangement that no movement of flue gases will occur from the flue interior to the bearing location such as would subject the bearing to action of these flue gases. In this connection it is also noted that deposit of soot or other foreign matter on the bearing would seriously interfere with the freedom and delicacy of operation of the damper, and it is a further object of the invention to make effective provision against any such happening.

In connection with the foregoing I sometimes provide a slight baffle or gas flow formation adjacent to the location of the opening by which the damper is connected to the bearing, so that the normal flow of gases along the flue will cause a slight inflow of air into the flue through such opening, without, however, such inflow being of appreciable volumetric amount. Still, by this means I provide effectively against any outflow of corrosive gases or soot from the interior of the flue to the blade bearing location.

A further feature of the invention relates to the provision of a barometric damper arrangement such that it may be installed in either vertical or horizontal flues or stacks, and with equal facility, and with proper blade or damper balancing, with all the benefits hereinbefore mentioned. In this connection I have so arranged the balancing weights that they may be set at whatever angle is proper according to the direction of the flue with respect to the horizontal, and still secure the perfect balancing effect and operations herein disclosed. This includes the ability to bring the two opposing counterbalancing weights into proper relationship for any condition of flue direction with respect to the horizontal. This will make possible the use and installation of dampers of my invention in a wide variety of installations and conditions without having to carry in stock or inventory many different applications thereof to meet different installation conditions. Also, to accomplish this result without sacrifice of any operational benefits flowing from the use of the features of my present invention.

In connection with the deposit of soot from the flue, it is a further object and feature of the present invention to provide a damper blade which is effectively protected against deposit of soot on the blade. This result I accomplish by enameling the blade, preferably with a porcelain enamel. I have found in practice that such an enamelled surface will effectively resist the deposit of soot thereon, as well as protecting the blade against rust and other corrosion due to the presence of noxious gases in the flue stream.

A further feature of the invention relates to the provision of an arrangement such that when a thermostat is used for the furnace with what is known as a damper motor, or other suitable form of firing, that is, a firing arrangement in which the fuel feed is intermittent and not continuous, the damper blade of my damper will be held in position across the flue, thereby materially interrupting loss of heat from the fire to the flue between said intermittent firings. And such that when said firing is again resumed by such control the damper blade will again be allowed to function in its normally intended manner. This result I accomplish by a suitable connection between the heat or firing control and the damper blade, whereby when firing is discontinued said blade is held down in or across the flue, and thereby interrupts the free flow of gases along the flue, and also materially lessens the loss of heat from the furnace to the flue past the damper blade.

A further feature of the invention is to provide means for holding the damper blade in the fully open or baffle position during the intervals in which the oil burner, stoker, or other automatic heat producing method is inactive. This result I accomplish by means of a solenoid device mounted on the damper frame and so connected to the blade carrying shaft that when such solenoid is deenergized it drops the blade into the flue pipe and holds it in that position as long as the burner is inoperative. This will effectively and automatically interrupt or greatly reduce loss of heat from the furnace through the flue during the time that the oil burner, stoker, or other heat producing unit is inoperative. When such burner again starts operation the current is again delivered to such solenoid device and the damper is released and permitted to function in its normal manner.

Other objects and uses of the invention will appear from a detailed description of the same, which consists in the features of construction, and combinations of parts hereinafter described and claimed.

In the drawings:

Figure 2 shows a plan view corresponding to Figure 1;

Figure 3 shows a longitudinal section corresponding to Figures 1 and 2;

Figure 4 shows a cross-section on the line 4—4 of Figure 1;

Figure 5 shows a cross-section on the line 5—5 of Figure 1 on reduced scale;

Figure 1:
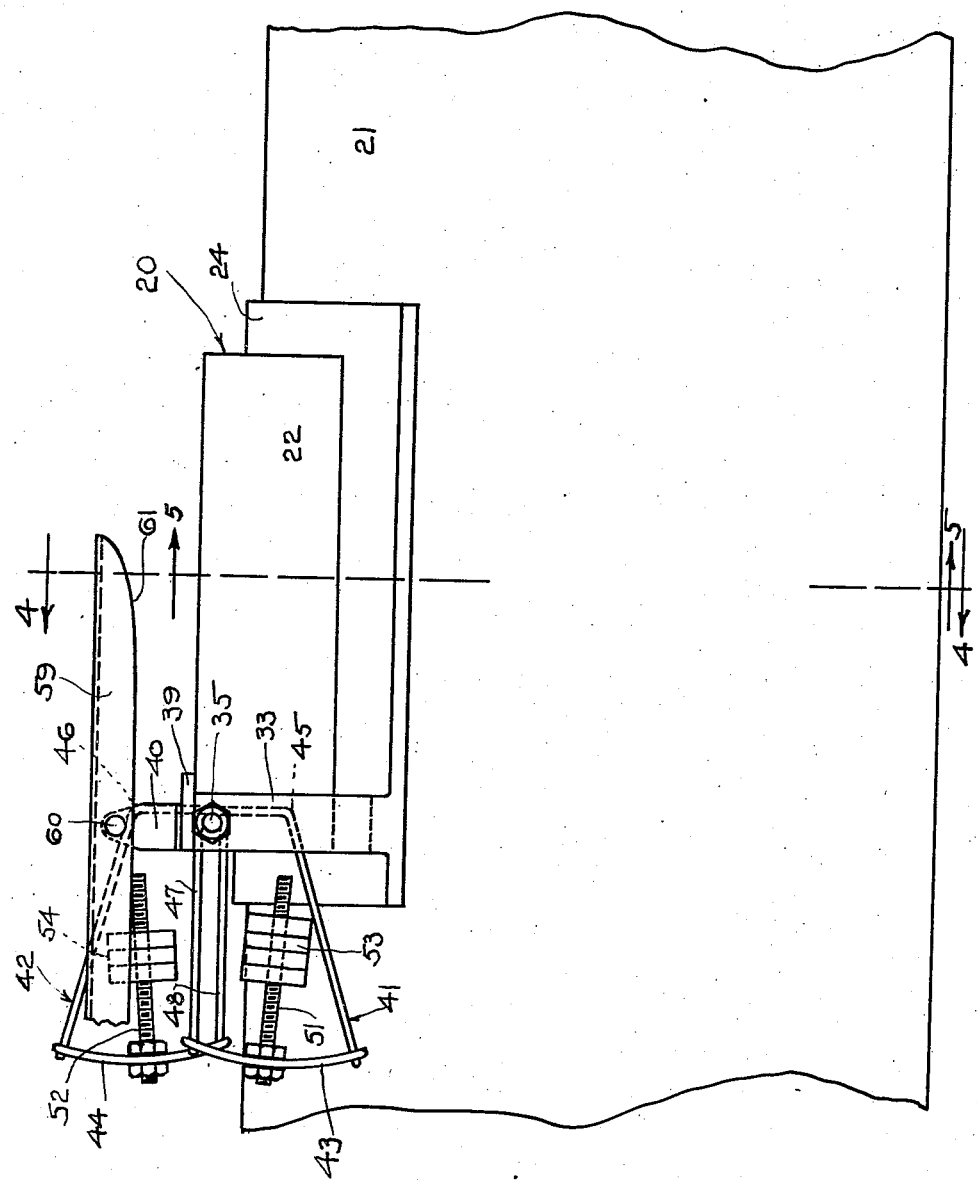
Figure 1 shows a side elevation of a flue section having applied or attached thereto a damper embodying the features of my present invention.
Figure 6:
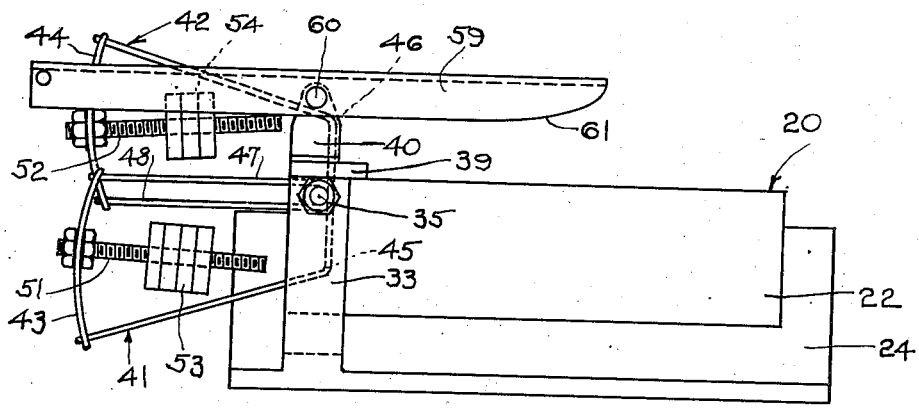
Figure 6 shows a side or elevational view of the damper unit removed from the flue, and as a self-contained unit.
Figure 7:
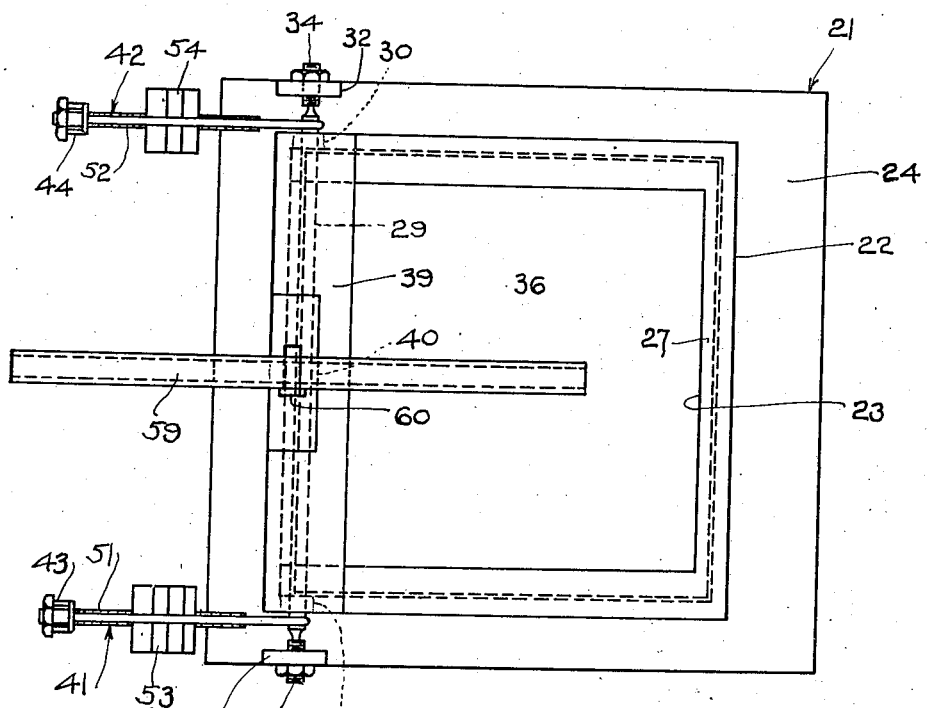
Figure 7 shows a plan view corresponding to Figure 6.

In the drawings I have shown a damper embodying the features of my present invention installed on a section of flue or pipe, which pipe section reaches from the furnace to the chimney or stack. The damper unit in its entirety is designated by the numeral 20, and the flue or pipe by the numeral 21. This damper unit includes the frame 22, of rectangular form. This frame is so formed as to provide the rectangular opening 23 of ample size, and also to provide the outwardly extending flange 24 which is curved to conform to the curvature of the exterior of the flue on which the damper assembly is to be placed (for example, six, seven, eight, nine or ten inch flues). This frame is also provided with the inwardly reaching flange 25 which sets through an opening 26 cut into the flue or pipe, said opening 26 being of such form and contour that when projected onto a flat surface it forms a rectangle. This frame 22 also has the inwardly reaching flange 27 whose inner edge forms the opening 23 already referred to; and it is noted from examination of the drawings that this flange 27 lies in a plane which is tangent to a circle of greater diameter than the flue diameter (so that the inner face of said flange 27 lies in a plane outside of the normal or outside diameter of the flue itself). Generally a suitable slightly yieldable gasket 28 of asbestos or like composition is cemented to the inner face of this flange 27 to form a slightly yieldable edge against which the edge portion of the damper blade (presently to be described) will seat when the damper is fully closed, and with a substantially air-tight seal. This gasket, when used, may be extended around three sides of the opening 23, leaving the fourth or pivot side un-gasketed.

A damper blade shaft or rod 29 is extended across the frame (and transverse to the direction of gas flow) at the approaching side of the frame 20 (that is, at the side or end thereof first met by the stream of oncoming gases flowing through the flue). A suitable and desirable means to journal this shaft or rod is as follows: Notches 30 and 31 are provided in the side walls or portions of the flanges 22 and 27, reaching inwardly to positions close to the surface of the flange 24, and said notches being located close to the leading end wall of the flanges 22 and 27, as shown. The shaft or rod 29 then extends through these notches and to the outside of the frame as shown. Suitable brackets 32 and 33 may be provided on the flange 24 and beyond the flange 22, so that the ends of the shaft or rod 29 may be journalled by means of socketed nuts 34 and 35 threaded through these brackets, the ends of the shaft or rod 29 being pointed as shown, but with a taper less than the angles of the sockets in the nuts, so that a point bearing is provided. If desired lock nuts may be placed on the nuts 34 and 35 in well understood manner.

The blade 36 of the damper is welded or otherwise secured to this shaft or rod tangentially thereof, and on that portion of the shaft or rod which is beneath the axis thereof. This arrangement is well shown in Figure 3, wherein the blade is in position against the gasket, or closing position. It is noted that the position of the shaft or rod is such that when the blade moves to closed position its surface comes squarely against the edge of the gasket; and this result is secured by placement of the shaft or rod in such position, relative to the gasket that the bottom surface of such shaft or rod is in the same plane as the edge of the gasket. In other words, the edge of the gasket lies in a plane tangent to the underside of the shaft or rod surface. This assures a perfect engagement of the edge portion of the blade surface against the gasket when the blade moves to the closing position as shown in Figure 3. Furthermore, the shaft or rod is sufficiently removed from the end wall of the flange 22 at the approaching end of the same to allow the blade to move to a position directly across the flue axis, as shown by the dotted lines in Figure 3.

The blade normally tends to swing down into a vertical position, but suitable counter-weight arrangements are provided as will presently appear. It is here noted, however, that the flange 25 only reaches inwardly (on its sides and far or delivery end) far enough to slightly enter the passage of the flue but without any material interference with the flow of gases along such flue. For this purpose, also, said flange, at the far or delivery end, is curved to conform to the flue curvature, as shown at 37. However, at the near or entering end said flange is carried straight across the flue as shown at 38, so that a slight baffle is produced by this portion of the flange, and this baffling effect occurs at a location almost directly beneath but slightly in advance of, the location of the shaft or rod 29, and the notches 30 and 31. This slight baffle 38 is sufficient to cause a swirling of the on flowing flue gases so that a slight vacuum or reduction of pressure occurs just beyond the location of this baffle 38. Such reduction of pressure is enough to ensure a slight draw of air inwardly through the notches 30 and 31, thereby preventing any tendency of outflow of flue gases through said notches, with consequence that there is never any outflow of flue gases at and adjacent to the location of the shaft or rod, and also none at or adjacent to the locations of the shaft or rod bearings. This is a very important feature, inasmuch as it is necessary to provide an opening at or adjacent to the shaft or rod location, and I have provided such opening without, however, allowing any escape of flue gases therethrough during operation.

Conveniently a plate 39 may be placed over the leading or approaching end portion of the flanges 22 and 27, as shown, such plate covering over the shaft or rod and giving protection thereto. Such plate, when used, may also serve to support a bracket 40 to be presently referred to further.

Suitable counterweights are provided for controlling the blade movements, and for providing suitable counter-balance for said blade, and I shall now describe the same in detail.

Attached to the rock shaft 29 are the two frames 41 and 42; and conveniently these frames are spot-welded to the projecting end portions of said rock shaft beyond the housing wherein the damper is contained, and close to the shaft journals. Thus these frames are located to the outside of the housing as well seen from several of the figures. Each of these frames is of generally rectangular form, with attachment to the rock shaft in one of the frame corners; but it is seen that the outer portion of each frame is of curved form, as shown at 43 and 44. These curves are preferably circular arcs, drawn about the corners 45 and 46 of the frames; and furthermore, these frames are preferably connected to the shaft in such manner that their sides 47 and 48 lie parallel to each other.

The curved or arcuate sides of these frames are slotted to provide the slots 49 and 50 (best seen in Figure 4); and weight-carrying arms 51 and 52 are adjustably connected to these arcuate portions, as by extending the ends of these arms 51 and 52 through the slots, and locking them in position by suitable lock nuts as shown. These arms extend radially with respect to the corners 45 and 46 on which the curves are drawn. By loosening the lock nuts the radial arms may be moved over the curved portions to different positions of adjustment as readily evident. These radial arms carry the counter-weights 53 and 54, respectively; and conveniently these radial arms and counter-weights are threaded together so that by rotating the weights they may be adjusted back and forth along the arms. Furthermore these counter-weights may be made of the same mass or of different masses, and of selected weights as compared to the weight of the damper blade. In the arrangement shown these counter-weights are formed of discs, so that by using a greater or smaller number of such discs the weights may be made greater or smaller as desired. In the form shown there are three discs on the arm 52 and four on the arm 51, making a weight ratio of three to four, but manifestly any suitable ratio or absolute amounts of the weights may be used as required or selected by the installer.

Now it will be evident that the counter-balancing effect of each weight and its supporting arm will depend on the angular position and radial displacement of the center of mass of such weight and arm with respect to the blade and the axis of rotation. In the arrangement shown the parts have been so set and illustrated that these counter-weights centers of mass lie substantially thirty degrees above, and thirty degrees below the plane of the blade, when the blade is in the closed position illustrated; and under these conditions both counter-balancing masses are effective to balance the blade when in closed position, illustrated. By suitable adjustment of these masses out along the rods 51 and 52 an exact balancing effect may be secured, or a slight over-balance may be provided, tending to hold the blade closed until the desired amount of draft pressure against the blade face has been built up. Thereupon the blade will commence to open. As soon as opening commences it will be seen that the effective radius of the weight 54 and arm 42 will decrease (since such effective radius depends on the cosine of the angle of departure from the horizontal); but at the same time the effective radius of the weight 53 and arm 41 will increase until the center of mass thereof reaches the horizontal position, after which further blade rocking will result in decrease of the effect of the weight 53 and arm 41. It will also be evident that in case of sufficient rotation of the blade to carry the weight 54 and arm 42 beyond the vertical position, the effects of these parts will reverse, causing them to aid the mass of the blade, both acting against the mass of the weight 53 and arm 41 which still lie to the original side of the plane of verticality.

Figure 10:
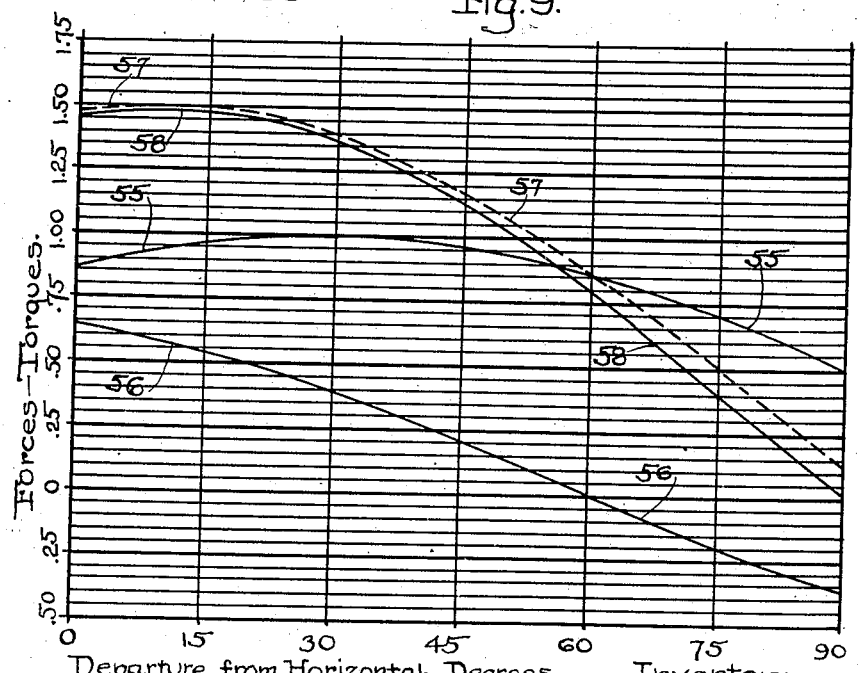
Figure 10 shows by suitable curves the relative operational forces of the two counter-weights whereby the blade operation in normal service is controlled.

Now the effects of these parts have been graphically shown by curves in Figure 10. In this figure the curve 55 shows variation of the effect of the weight 53 and arm 41, and the curve 56 shows the effect of the weight 54 and arm 42, and the curve 57 shows the combined effects of all these parts. The curve 58 shows the variation of the effect of the blade. All these curves are plotted for variations of blade position from the horizontal, in degrees.

Now it will be noted that the effect of increasing cosine of the weight 53 and arm 41, against decreasing cosine of the weight 54 and arm 42 is to maintain the combined effects of both counter-balances at a higher position than would otherwise be the case, thereby holding the counter-balancing effect of all these parts higher than would otherwise be the case, during the early stages of the blade opening movement; and a further effect is that the combined curve 57 is quite flat during blade rotation of substantially thirty degrees from the closed position. It is further noted that the curve 58 lies slightly below the combined curve 57, meaning that, without draft effect there is a closing tendency at all times, tending to move the blade to closed position. Further it is noted that the curves 57 and 58 are closer to each other during the early stages of angular movement than during later or more open stages. The distance between these curves is a measure of the force needed to cause blade opening movement, namely, effect needed from draft to cause opening movement. These curves tell us that such draft effect needed in early stages is less than at later or more open stages; but the variation is quite small. Conversely, these curves tell us that as the blade moves to the fully closed position the presence of the draft acts as a baffling or slowing force so that even if a rather quick closing movement occurs, from a well opened position, there will be a checking action as the blade approaches the fully closed position, so that slamming or banging of the blade against the stop will be avoided. This action may be compared to that of a common door check wherein as the door comes close to the fully closed position its movement is checked and it finally closes with a sufficient but restrained force.

Due to the variation of distance between the curves 57 and 58 it is also evident that there will be and is a control of the action so that "fluttering" of the blade will be effectively prevented, and even with sudden and relatively large variations of "pull" from the chimney, due to sudden gusts of wind, there will be well controlled action of the blade, so that the opening thereof will at all times be such as to maintain a very uniform draft in the flue back of the damper location, and at the furnace being served. The combined actions of these two counter-weights and the two arms, are therefore such as to produce a very effective and desirable operation for the intended purposes.

It is further to be noted that the draft which will be maintained is readily adjusted by merely setting the weights 53 and 54 in or out along their arms 51 and 52, respectively, since the mass of the damper blade being served remains constant. It is also noted that by adjusting the arms 51 and 52 over the curved or arcuate portions, it is possible to adjust the relative actions of the two weights with respect to each other.

Thus it is possible to set one of these arms (for example the lower one, 51) at a greater angle below the horizontal (for horizontal blade position) than the angle of the arm 52 above the horizontal for such blade position, or conversely. Thereby the relative actions of these two counterbalancing members may be readily adjusted, so that the forms and relative positions of the curves 55 and 56 may be adjusted, with corresponding adjustment of the form and height, and location of the combined curve 57, and also the form of its flattened portion. Thus I have provided a very flexible arrangement, one which may be very readily adjusted to desired operating characteristics, by an operator with little skill, and one which may meet a very wide range of operating requirements.

It will also be noted that in case of departure of the flue installation from the horizontal it is possible to set both of the arms 51 and 52 to proper positions along the arcuate supports, and to adjust the sizes and radial positions of these weights, to meet the conditions imposed by such flue direction. Furthermore, it is possible to set the frames 41 and 42 on the rock shaft at such angular positions with respect to the blade itself as to meet the conditions imposed by verticality of the flue, instead of horizontality, as shown, thus making my improvements useful in all cases, either horizontal, or vertical, or at any angle between these two extreme conditions.

It will also be understood, that although I have shown the frames 41 and 42 as being connected to the opposite end portions of the rock shaft, still they might be equally attached to one and the same end portion; but the arrangement shown is a well balanced one and makes possible the placement of the two brackets or ears 32 and 33 at equal clearances from the center line of the device.

Figure 8:
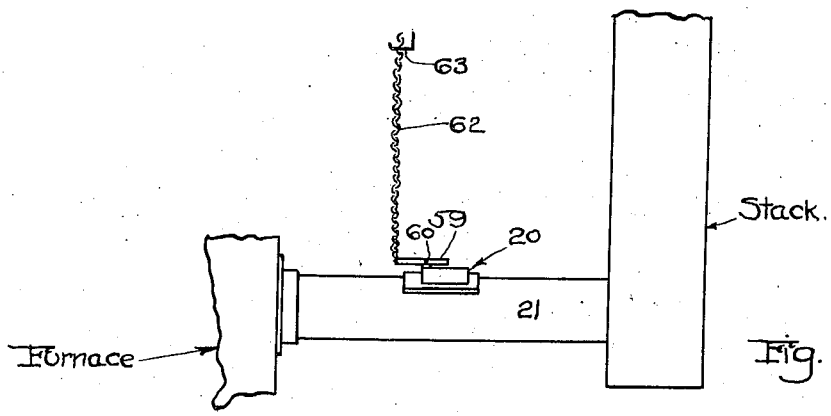
Figure 8 shows more or less diagrammatically a control for the damper of my present invention whereby said damper blade may be held in fully opened position across the flue when the draft is checked as by a chain or other control connection.

The bracket 40 was previously referred to. This bracket, when provided serves to pivotally support an arm 59, by means of the pin 60. This arm overlies the damper blade, and is preferably provided with an end shoe 61 so that by tilting the arm sufficiently said shoe will press against the blade and force it open to any desired extent. The other or free end of this arm may be operated in any desired manner, for opening of the damper independently of draft conditions. Thus, as shown in Figure 8 the free end of this arm may be controlled by the chain 62, carried to the room where such control is to be effected. A suitable hook or the like 63 may be provided to which this chain may be attached when drawn to damper open position; and the extent of such damper opening may be regulated by connection of a selected link of the chain to said hook. In case such arm 59 is not required it may be readily removed by drawing out the pin 60, as will be readily understood.

Figure 9:
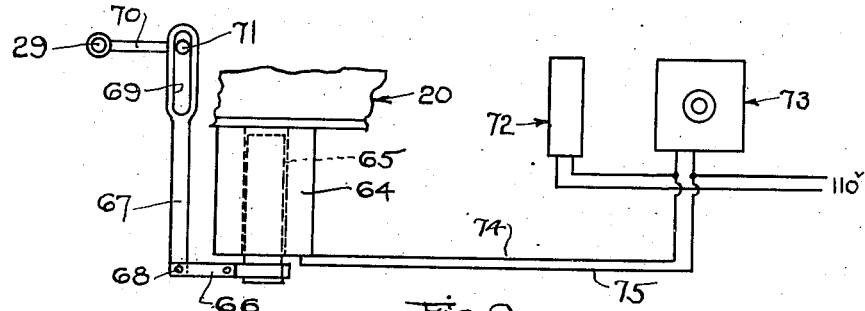
Figure 9 shows more or less diagrammatically a control for the damper blade including the intermittent heat control.

Reference to Figure 9 shows, more or less schematically, means whereby the operation of my improved damper may be harmonized with and controlled by a suitable form of burner control. In this case I have shown the damper frame as carrying the solenoid 64, which solenoid acts on the armature 65. Said armature carries the bracket 66 which has the upstanding link 67 (connected thereto by the pivotal connection 68); and said link 67 is provided with the slot 69. The rock shaft of the damper blade is provided with the arm 70 having a pin 71 engaging the slot 69. The arrangement is such that the following operations are secured:

The solenoid 64 is so connected to the heat control that when current is being supplied to the stoker motor or oil burner, or other instrumentality, current is supplied to this solenoid, to thereby draw up the armature 65 and take up some of the lost motion of the slotted connection to the pin 71. Thereby the link 67 is retained in its up position, but still the rock shaft is permitted to rock for damper opening movement, the pin 71 travelling down along the slot 69 as far as needed for such damper opening. When current to the stoker motor or to the oil burner or other heating device ceases, current also ceases to flow through the solenoid 64, and the weight of the armature 65, bracket 66, and link 67 drops said parts to take up the lost motion of the slot 69, and to further draw the arm 71 down, thereby forcefully opening the damper, and retaining it in open position, irrespective of draft conditions. In other words, under these conditions the damper is retained in fully opened position as long as automatic firing ceases. When automatic firing recommences the solenoid is re-energized, and the armature 65 is raised, and the damper is allowed to close naturally, and to thereafter open and close in the intended manner for automatic barometric damper operation. I have also shown more or less schematically, in Figure 9 the thermostat control by the numeral 72, and the stoker motor (in case of stoker operation) by the numeral 73, the connecting leads being also schematically shown by the numerals 74 and 75. I have not herein shown the details of such thermostat control, as many such are in use, and their constructions and methods of operation are well known in this art. Suffice it here to show that the energization of the solenoid 64 is properly harmonized with respect to delivery of current to the motor so that cessation of motor operation (or cessation of oil burner operation) is harmonious with cessation of delivery of current to such solenoid (or conversely).

I also wish to point out that by this arrangement a very important benefit is secured as follows:

The flow of current through such a solenoid almost invariably causes "solenoid noise," due to reversals of magnetism in the core (when using alternating current), and such noise is in the nature of a hum and is quite bothersome in most cases. The motor and stoker (or oil burner) operation, also, necessarily causes noise. When the motor or burner operation ceases the noise therefrom also ceases, so that if the solenoid were to be energized at such time this "solenoid noise" would be very noticeable. By so arranging the parts that the solenoid is de-energized at the same time that current supply to the motor or burner ceases we shall have complete quiet at the time when desired, and the hum of the solenoid will not be apparent when the motor or burner is operating, since the noise of these latter elements greatly overpowers this "solenoid noise" or hum.

I claim:

1. In a barometric damper the combination of a rectangular frame adapted for attachment to a flue to be served, a rock shaft journalled with respect to one end portion of such frame, a damper blade connected to said rock shaft, a suitable seat in the frame for the edge portion of such blade, said seat lying substantially parallel to flue axis, together with means to counterbalance said rock shaft and blade, comprising a pair of frames secured to said rock shaft, each such frame including an arcuate side, a weight supporting arm adjustably connected to such arcuate frame side, means to secure such weight supporting arm in adjusted position, and a weight adjustably mounted on each such weight supporting arm, said weight supporting arms being set at different angular positions on the arcuate frame sides with respect to the plane of the damper blade.

2. In a barometric damper the combination of a rectangular frame adapted for attachment to a flue to be served, a rock shaft journalled with respect to one end portion of such frame, a damper blade connected to such rock shaft, a suitable seat in the frame for the edge portion of such blade, together with means to counterbalance said rock shaft and blade, comprising a pair of frames secured to said rock shaft, each such frame including an arcuate side, a weight supporting arm adjustably connected to such arcuate frame side, means to secure such weight supporting arm in adjusted position, and a weight adjustably mounted on each such weight supporting arm, said weight supporting arms being set at different angular positions on the arcuate frame sides with respect to the plane of the damper blade.

3. In a barometric damper the combination of a frame adapted for attachment to a flue to be served, a rock shaft journalled with respect to said frame, a damper blade connected to such rock shaft, a suitable seat for said blade in said frame, together with means to counter-balance said rock shaft and blade, comprising a pair of weight supporting arms, means to connect said arms to the rock shaft adjustably with respect to the plane of the blade, a weight adjustably mounted on each said arm, and adjustable radially thereon with respect to the axis of the rock shaft, said arms being located at opposite sides of the plane which includes the blade.

4. In a barometric damper the combination of a frame adapted for attachment to a flue to be served, a rock shaft journalled with respect to said frame, a damper blade connected to such rock shaft, together with means to counter-balance said rock shaft and blade, comprising a pair of weight supporting arms, means to connect said arms to the rock shaft adjustably with respect to the plane of the blade, a weight adjustably mounted on each said arm, and adjustable radially thereon with respect to the axis of the rock shaft, said arms being located at opposite sides of the plane which includes the blade.

5. In a barometric damper the combination of a frame adapted for attachment to a flue to be served, a rock shaft journalled with respect to said frame, a damper blade connected to such rock shaft, together with means to counter-balance said rock shaft and blade, comprising a pair of weight supporting arms, means to connect said arms to the rock shaft adjustably with respect to the plane of the blade, a weight adjustably mounted on each said arm, and adjustable radially thereon with respect to the axis of the rock shaft, said arms being located at opposite sides of the plane which includes the blade.

6. In a barometric damper adapted to serve a flue at the position of an opening into the upper portion of said flue, the combination of a frame adapted for attachment to said flue at such opening location, said frame including a body portion extending outwardly from the flue wall, there being openings in said body portion adjacent to one end thereof, for accommodation of a transverse rock shaft, a damper connected to said rock shaft, bearings for said rock shaft completely external to the body of the frame of the damper, together with a baffle on the frame reaching downwardly into the flue to be served, and located immediately in advance of the rock shaft in the direction of gas flow through the flue, to thereby deflect said gases from said rock shaft openings.

7. In a barometric damper adapted to serve a flue at the position of an opening into the upper portion of said flue, the combination of a frame adapted for attachment to said flue at such opening location, said frame including a body portion extending outwardly from the flue wall, there being openings in said body portion adjacent to one end thereof, for accommodation of a transverse rock shaft, a damper connected to said rock shaft, bearings for said rock shaft completely external to the body of the frame of the damper, together with a plate mounted on the frame of the damper over said rock shaft and said openings.

8. In a barometric damper adapted to serve a flue at the position of an opening into the upper portion of said flue, the combination of a frame adapted for attachment to said flue at such opening location, said frame including an opening in alignment with said flue opening, a rock shaft journalled for rocking movement across said opening adjacent to one end thereof, a damper blade connected to said rock shaft, means to counter-balance said damper blade to move said blade to closing position, together with a plate mounted on said frame over the position of said rock shaft, and an arm removably and pivotally connected to said plate in alignment with said damper blade, and adapted to press the damper blade into open position irrespective of draft conditions within the flue.

9. The combination with the electrically operated fuel feed and the flue of a heating unit, of a damper for said flue, said damper including a frame for attachment to said flue at the position of an opening in the upper portion of said flue, a rock shaft journalled in said frame adjacent to the position of said opening, a damper blade connected to said rock shaft, and adapted for full opening downwardly into the flue being served to a position across said flue to thereby interrupt heat loss from the furnace along said flue, counter-balance means in connection with said rock shaft tending to rock the same to damper blade closing position, together with connections between said rock shaft and said electrically operated fuel feed effective to retain the damper in fully opened position when the fuel feed is inoperative and to permit normal operation of said damper when the fuel feed is in electrical operation.

RAYMOND E. YOUNG.